C. D. HOUSE.
Instrument for Smoothing and Leveling the Teeth of Horses.
No. 200,300.   Patented Feb. 12, 1878.
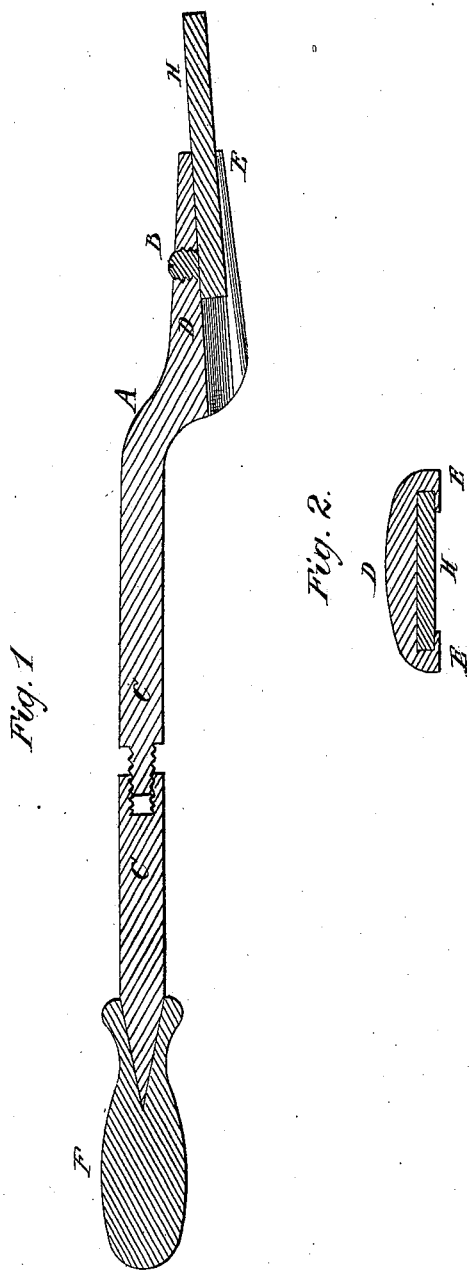

UNITED STATES PATENT OFFICE.

CHARLES D. HOUSE, OF NEW YORK, N. Y.

IMPROVEMENT IN INSTRUMENTS FOR SMOOTHING AND LEVELING THE TEETH OF HORSES.

Specification forming part of Letters Patent No. 200,300, dated February 12, 1878; application filed January 25, 1878.

*To all whom it may concern:*

Be it known that I, CHARLES D. HOUSE, of the city, county, and State of New York, have invented certain new and useful Improvements in Tools or Instruments for Leveling and Smoothing Off the Teeth of Horses and other Animals; and I do hereby declare the following to be a full, clear, and exact description of the same, reference being made to the accompanying drawing, forming a part of this specification, and in which—

Figure 1 is a longitudinal vertical section of my improved implement; Fig. 2, a cross-section of the same.

This invention relates to improvements in tools or instruments for leveling and smoothing off the sharp edges of the teeth of horses and other animals.

Heretofore horse-tooth files have been constructed of a metal stock or handle, provided with lips for receiving and retaining a steel file, which was secured therein, and held in position by means of said lips and a set-screw; but such construction is obviously objectionable, for the reason that the screw for holding or securing the file in the holder was arranged at the extreme end of the back of the stock or handle, upon which the lips are formed; and the lips being of the same size throughout their entire length, the implement could not be adapted for filing the front and the extreme back teeth of an animal, on account of the lips projecting to such an extent beyond the face of the file as to render the implement entirely inoperative, and the file not adapted to have a forward longitudinal adjustment beyond the file-holder to make it operative.

My invention is intended to obviate the above-cited objections; and to this end the invention consists in the construction and arrangement of parts, as will be hereinafter fully described, whereby the implement is adapted to be used upon all of the teeth of an animal.

In the drawing, D represents the tool-holder, smooth, and with a slight curve on its back, and provided with two lips or flanges, E E, for the purpose of receiving and retaining an oblong piece of emery, H, or other grinding-stone, &c., (or a file, if desired.) The lips or flanges E E extend lengthwise, but not across either end, so as not to obstruct the free adjustment of the tool-holder in either direction.

The holder D is also provided with a binding-screw, B, placed at the center, or nearer the center than the ends, which holds the polishing-tool in whatever position it may be placed by crowding it against the back of the holder. The flanges E E have a slight taper on their upper and inner faces toward the front end of the holder, so that the front surface of the file can be brought in contact with the teeth without projecting it too far beyond the holder, obviating the defects incident to having the lips of the same size throughout their entire length, thus forming shoulders, which strike against the jaws of an animal when filing the extreme back teeth.

The handle C extends back in a straight line from the curve A, and is made in two parts and jointed together. The handle can be made in one piece with the holder D, and not jointed; but it will not be so convenient as if jointed in using and packing. To the end of the handle C is attached a wooden handle, F. The metal parts are to be nickel-plated, or otherwise protected from rusting.

By means of the sectional handle it can be shortened when the grinding-tool is extended from its holder, for operating upon the front teeth, and the handle lengthened when the grinding-tool is drawn back in the holder, for operating upon the extreme back teeth of an animal.

I do not desire to claim, broadly, a horse-tooth file in which the holder is provided with lips or flanges for receiving and retaining a file, as I am aware such construction is old; but

I claim as my invention—

A tool or instrument for filing or leveling the teeth of animals, consisting of the following elements, viz: a holder with its retaining-groove beveled to allow the easy passage between the back teeth, a grinding or filing tool made adjustable as to its length by a set-screw located near the center of the holder, and a sectional handle which may be shortened when the instrument is to be used upon the front teeth with the grinding-tool extended, the several parts constructed and arranged as herein shown and described.

C. D. HOUSE.

Witnesses:
HORACE WICKHAM, Jr.,
R. D. DARLING.